United States Patent Office 3,431,142
Patented Mar. 4, 1969

3,431,142
METHOD OF IMPROVING WEARING QUALITIES OF ORGANIC FIBERS AND FABRICS
Herbert Schwarz, St. Petersburg, Fla., assignor to Petchen Corporation, St. Petersburg, Fla., a corporation of Florida
No Drawing. Filed Aug. 19, 1965, Ser. No. 481,096
U.S. Cl. 117—139.5          4 Claims
Int. Cl. C08j 1/32; C10m 3/00

ABSTRACT OF THE DISCLOSURE

A stable aqueous emulsion comprising a mixture of a major part by weight of a tetra ($C_3$–$C_{12}$ alkyl) ortho-silicate, and minor parts by weight of a non-ionic emulsifier and a cationic emulsifier with a small amount of an organic solvent being permissibly present. The emulsion is used in a method for imparting to textiles increased resistance to wear and abrasion.

---

This invention relates to a novel method of treating organic textiles so as to increase their resistance to wear and abrasion.

Heretofore, various methods have been proposed for improving the qualities of organic textiles, including both fabrics and fibers. Many of these have involved attempts to coat, or alternatively, to impregnate the fibers with silica or one of its derivatives. For example, U.S. Patent No. 2,443,512 discloses a method of applying colloidal silica to cotton fibers in order to improve slip resistance and increase tensile strength, as do U.S. Patents Nos. 2,527,329 and 3,016,304. Apparently, the use of preformed colloidal silica as in these patents left something to be desired; for U.S. Patent No. 2,507,200 advocates that organic fibers be treated with a solution of an alkyl polysiloxane in order to render them water-repellent. Taking a somewhat different tack, U.S. Patent No. 2,637,623 asserts that flame resistance, water repellency etc. of organic fibers can be improved by impregnating them with an aqueous solution of a trialkyl (alkoxypyridine chloride) silicone or a trialkyl (oxyalkanolamido methyl pyridinum chloride) silane, hydrolysing the oxygen-silicon linkage, drying and then heating the dried fabric in the range 80–250° F. U.S. Patent No. 2,662,039 believes that treatment of a fabric with a silicone oil-in-water emulsion will increase the water repellency of the fabrics.

Emblem, in U.S. Patent No. 2,699,410, tried a different approach. He found that the tendency of fibers to slip over one another can be decreased by treating the fibers with an orthosilicate emulsion containing a protective colloid, which emulsion is allowed to form a gel which is in turn allowed to dry on the fiber. Apparently, some silica gel is formed by hydrolysis, but the results are not primarily the consequence of any hydrolytic process.

Other prior art patents use different methods of applying a compound of silicon to a fabric. For example, U.S. Patent No. 3,058,936 advocates applying a water-emulsion of a hydrogen silicone with a catalyst to aid in the polymerization of the silicone in order to impart water-repellency to the fabric. U.S. Patent No. 2,916,461 advocates using a reaction product of ethylene glycol and an alkyl alkoxy silane.

It is apparent from the above summary of the most important patents in this field that treatment of fabrics with compounds of silicone serves to increase their anti-slip qualities, their water repellency, or their anti-static qualities; that many types of silicone compounds can be applied to fabrics in various forms; and that no single process or compound has been so successful as to end research efforts in this area. It is particularly noteworthy that the prior art, as represented by the above patents, is silent as regards any improvement of wearing qualities in the fabric treated with a silicone compound.

It is an object of this invention to provide a novel type of emulsion for treating organic fibers with silicates. It is a further object of this invention to provide silicate-treated fabrics with increased wear and abrasion resistance. Other objects of this invention will become apparent from the description which follows.

In fulfillment of the above and other objects, this invention provides a method for treating organic textiles, including fibers and fabrics, so as to increase their resistance to wear and abrasion, comprising contacting said fibers with an aqueous emulsion containing a tetra alkyl ortho-silicate, non-ionic emulsifier and a cationic emulsifier. The tetra alkyl silicates which can be used should have from three to twelve carbon atoms per alkyl group, and include such radicals as the n-propyl, isopropyl, n-butyl, isobutyl, sec.-butyl, n-amyl, isoamyl, sec.-amyl, 3-methyl-2-butyl, 2-ethylbutyl, n-hexyl, 2-hexyl, 3-hexyl, 3-methyl-2-pentyl, 2-methylhexyl, 2-methyl-3-hexyl, n-heptyl, iso-heptyl, 2-ethylhexyl, n-octyl, iso-octyl, n-nonyl, n-decyl, n-undecyl, n-duodecyl, 2-ethyldecyl and the like. I prefer to use tetra alkyl silicates in which the alkyl group has from 6–8 carbon atoms, although other tetra alkyl silicates containing one or more alkyl groups having more or less carbon atoms than those within the preferred range are fully operative. Typical preferred tetra alkyl ortho-silicates useful in my novel invention includes tetra(2-ethylbutyl) ortho-silicate, tetra(2-ethylhexyl), ortho-silicate, tetra(n - heptyl) ortho - silicate, di(2 - ethylbutyl) - di(2-ethylhexyl) ortho-silicate, tetra(3,4-dimethylpentyl) ortho-silicate, and the like.

In my novel composition, the non-ionic emulsifier should have an HLB (hydrophile-lipophile balance) in the range 9–20. Typical suitable non-ionic emulsifiers having this desirable characteristics include polyoxyethylene glycerides, sorbitan monolaurate, sorbitan monostearate, sorbitan trioleate, polyoxyethylene lanolin alcohols, polyoxyethylene cetyl ether, polyoxyethylene lauryl ether, and the like. Of these, I prefer to employ the polyoxyethylene long chain alkyl ethers, which have from 10–20 ethylene oxide residues in the polyoxyethylene chain.

The cationic emulsifiers useful in forming the novel emulsions of my invention include such materials as stearyltrimethyl ammonium bromide, stearyldimethylbenzyl ammonium bromide, dicocodimethyl ammonium chloride, myristyldimethyl amine oxide, 1-(hydroxyethyl)-2-(heptadecenyl) imidazoline hydrochloride, dimethylaminoethyl-stearoyl amide, oleylimidazoline, lauryl pyridinum chloride, bis(polyoxyethylene) aurylamine, and the like. Of these, I prefer to use 1-(aliphatic-substituted)-2-(hydroxyethyl) imidazolines where the aliphatic group has from 11 to 17 carbon atoms i.e, undecyl, tridecyl, pentadecyl, heptadecyl, heptadecenyl, heptadecadienyl, etc. The presence of the cationic emulsifier is critical to my novel process and is believed to account for the superior results obtained thereby.

According to my novel process, a mixture containing a major part by weight of a tetra($C_3$–$C_{12}$ alkyl) ortho-silicate, and minor parts by weight of a non-ionic emulsifier, and a cationic emulsifier, with a small amount of an organic solvent being permissibly present, is added to water at a temperature of from 60–140° F. containing the textile to be treated. The mixture immediately forms a stable aqueous emulsion and the silicate precipitates on or is adsorbed on, the fiber or cloth. Immersion time for the textile should be 3 min. or longer in order to attain satisfactorily improved properties in the treated textile.

The amount of the silicate-emulsifier to be added depends on the weight of cloth to be treated and, for best results, is usually between one and three percent by weight. After a suitable immersion time, the treated cloth is freed, separated from the emulsion, and while still damp, is dried at temperatures in the range 60–230° F. The drying process "fixes" the silicate in the cloth so that it is not removed during subsequent washing. It is believed that the chemical nature of the silicate is changed during the drying process by either hydrolysis, dehydration or both.

In carrying out my novel process, it is possible, and even preferable, to employ commercial or home laundry equipment, wet textile finishing equipment, dye equipment, etc. The textile and water can be separated by any conventional commercial centrifugation, squeezing or extraction process and drying of the textile can be accomplished in any commercial or home dryer, steam dryer, hot can or the like.

Cloth treated by the above process has greatly improved wear resistance. For example, in the Wyzenbeek Abrasion test at a 1.5 lb. tension and 3.5 lb. pressure, the warp of untreated cotton cloth wore at 28,940 double rubs and the filling at 25,710 double rubs, whereas, cloth treated by the above process showed neither kind of wear at 50,000 double rubs. In addition, the treated fabric was quite resistant to successive commercial launderings, compared to the untreated fabric. It is a special advantage of my novel process that, despite the increased resistance to wear and abrasion imparted to the treated cloth, it suffers no change in appearance, feel, or color, even after many launderings.

This invention is further illustrated by the following specific examples:

Example I

A concentrate was prepared containing 80% by weight of tetra(2-ethylhexyl) ortho-silicate, 10% by weight of a polyoxyethylene ester of stearic acid having 12 ethyleneoxy residues in the polyoxyethylene chain, 5% by weight of 1-(undecyl)-2-(hydroxyethyl) imidazoline, preferably as the hydrochloride salt, and 5% butyl alcohol. 0.3 lb. of this concentrate was added to 12 gallons of water at 68° F. in an agitator-type home automatic washing machine containing 10 lbs. of a printed cotton fabric. The cloth was kept in contact with the resulting aqueous emulsion for 5 min. after which time the machine was put into a spin cycle, and the excess water removed by centrifugation. The damp treated cloth was then dried at 120° F. in an air dryer. A 6″ x 6″ specimen of the treated cloth was tested for abrasion resistance by test method 93–1959T of the American Association of Textile Chemists and Colorists. Using a 4.5 inch impeller at 3,000 r.p.m. for 3 min. with a 250 fine linear abrasive, there was only a 4.5% weight loss, and even after 6 min., there was no visible deterioration. By contrast, a 6″ x 6″ square of untreated cloth had a 6% weight loss after 3 min. and there was visible deterioration.

Example II

Two pounds of a concentrate containing 83% tetra(2-ethylhexyl) ortho-silicate, 13% of a polyoxyethylene tridecyl ether having 20 ethyleneoxy residues in the polyoxyethylene chain, and 4% of 1-(heptadecenyl)-2-(hydroxyethyl) imidazoline sulfate was added to a 1000 gallon wet textile finishing vat containing about 100 pounds of a standard cotton cloth. Immersion time was 4 min. and water temperature was about 120° F. The cloth was squeezed to separate the major portion of the water and finally steam dried at about 140° F. The cotton cloth so treated had increased wear resistance compared to untreated cloth.

Other organic fabrics and fibers including nylon–6, nylon–66, Dacron, Orlon, Kodel and the like, can have their abrasion and wear resistance improved by the above treatment.

In formulating the tetra-alkyl ortho-silicates with a cationic and a non-ionic emulsifier, the object is to obtain a stable aqueous emulsion of the ortho-silicate in water.

It will be apparent to those skilled in the art that both the relative and the absolute amounts of the non-ionic and cationic emulsifiers will depend upon their properties. In other words, if a di(long chain alkyl) dimethyl ammonium halide were employed in place of the above imidazoline, the amounts of this different cationic emulsifier needed to yield a stable aqueous emulsion would be quite different from those required for the imidazoline emulsifier. It is well within the skill of the art to determine optimum amounts and ratios for each pair of emulsifiers used, and all such combinations are included within the scope of this invention.

I claim:

1. A method of treating organic textiles including fibers and fabrics so as to increase their resistance to wear and abrasion which comprises:
   (A) Immersing said textile in a stable aqueous emulsion of tetra (2-ethylhexyl) orthosilicate,
      (a) said emulsion being formed by adding, at the rate of about 0.3 lb. per 12 gallons of water, a concentrate containing from 80–83% of tetra (2-ethylhexyl) orthosilicate, from 10–13% of a non-ionic emulsifier, either a polyoxyethylene ester of stearic acid having 12 ethyleneoxy residues in the polyoxyethylene chain or a polyoxyethylene tridecyl ether having 20 ethyleneoxy residues in the polyoxyethylene chain and from 4–5% of a cationic emulsifier, said emulsifier being a 1-($C_{11}$–$C_{17}$-aliphatic substituted)-2-(hydroxyethyl) imidazoline
      (b) said orthosilicate being present in from 1–3% by weight of the weight of the textile to be treated
      (c) at a temperature in the range 60–140° F.
      (d) for a period of time in excess of 3 min.
   (B) separating said textile from said emulsion and
   (C) drying said textile at a temperature in the range 60–230° F.

2. The process which comprises adding to an organic textile, suspended in water heated to a temperature in the range 60–140° F., 1–3% by weight of said textile of a concentrate containing 80–83% of tetra(2-ethylhexyl) orthosilicate, 10–13% of a non-ionic emulsifier, either a polyoxyethylene ester of stearic acid having 12 ethyleneoxy residues in the polyoxyethylene chain or a polyoxyethylene tridecyl ether having 20 ethyleneoxy residues in the polyoxyethylene chain and from 4–5% of a cationic emuslifier, said emulsifier being a 1-($C_{11}$–$C_{17}$-aliphatic substituted)-2-(hydroxyethyl) imidazoline; said concentrate forming a stable emulsion on addition to said heated water; said textile being maintained in contact with said orthosilicate emulsion for a period of time in excess of 3 min.; freeing said textile from said emulsion; and then drying said textile at a temperature in the range 60–230° F.

3. The process of claim 2 in which the organic textile is cotton.

4. The process of claim 2 in which the silicate is tetra-(2-ethylhexyl) orthosilicate.

References Cited

UNITED STATES PATENTS

| | | | |
|---|---|---|---|
| 2,544,732 | 3/1951 | Shechmeister | 117—143 X |
| 2,699,410 | 1/1955 | Emblem | 117—139.5 |
| 3,010,849 | 11/1961 | Lense | 117—139.5 |
| 3,055,926 | 9/1962 | Pollock | 260—448.8 |
| 2,693,427 | 12/1954 | Kingsford | 117—143 X |

WILLIAM D. MARTIN, *Primary Examiner.*

T. G. DAVIS, *Assistant Examiner.*

U.S. Cl. X.R.

117—121, 138.8, 143